Figure 5:
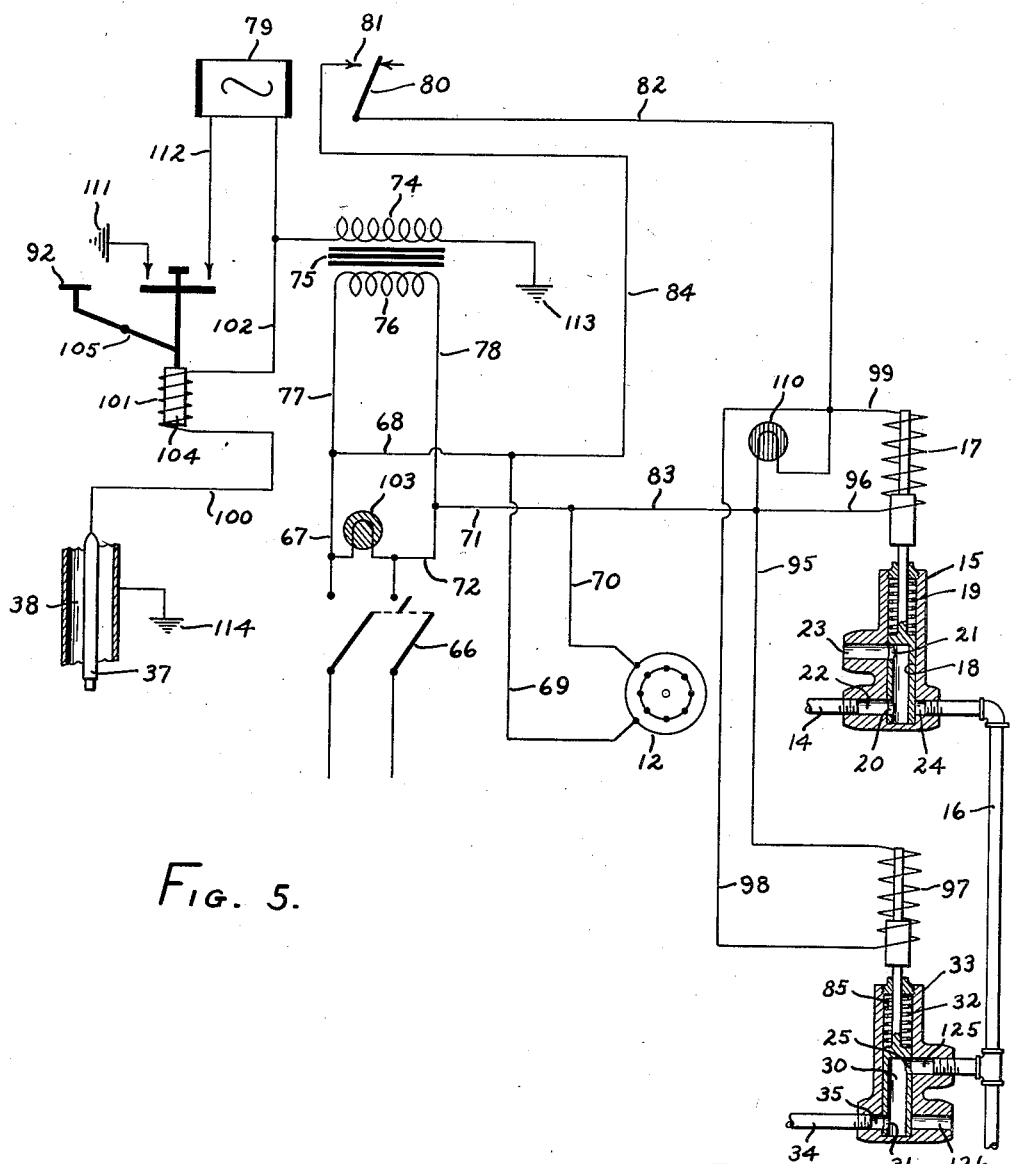

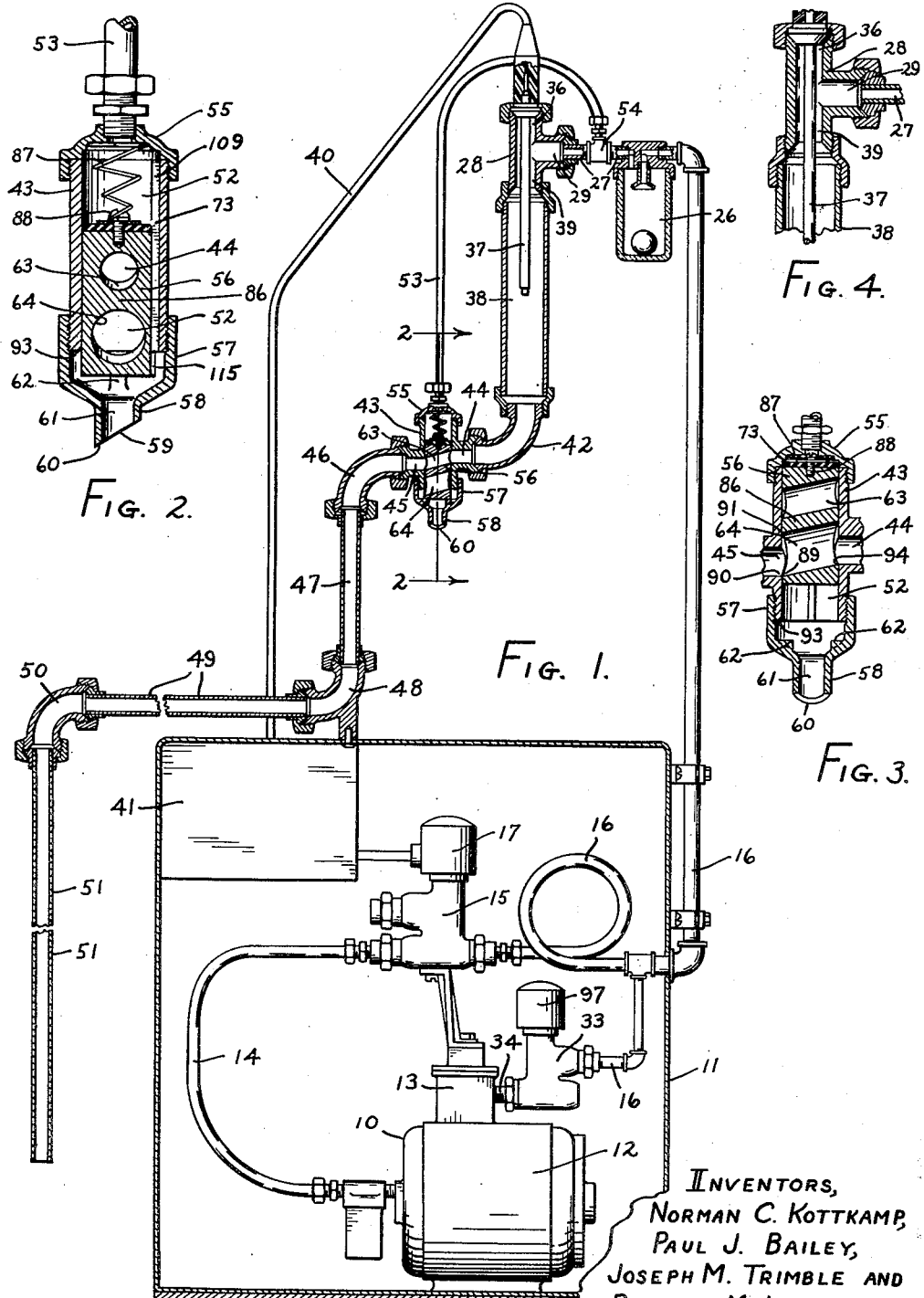

Nov. 7, 1950  N. C. KOTTKAMP ET AL  2,529,397
MILK SAMPLING APPARATUS
Filed April 22, 1949  2 Sheets-Sheet 2

INVENTORS,
NORMAN C. KOTTKAMP,
PAUL J. BAILEY,
JOSEPH M. TRIMBLE, AND
ROBERT M. LANGSENKAMP,
By Herbert A. Minturn
ATTORNEY.

Patented Nov. 7, 1950

2,529,397

UNITED STATES PATENT OFFICE 2,529,397

MILK SAMPLING APPARATUS

Norman C. Kottkamp and Paul J. Bailey, Indianapolis, Joseph M. Trimble, Lebanon, and Robert M. Langsenkamp, Indianapolis, Ind., assignors to The Langsenkamp-Wheeler Brass Works, Inc., Indianapolis, Ind., a corporation of Indiana Application April 22, 1949, Serial No. 89,012

12 Claims. (Cl. 73—422)

This invention relates to an automatic liquid sampling apparatus operating by a differential between a pressurized and a highly evacuated condition in a milk flow conduit. A primary object of the invention is to secure quickly and most accurately a predetermined quantity of milk to be used for various purposes, such as in determining the butterfat content. By means of the apparatus embodying the invention, the milk sample may be taken directly from the container received from the milk producer, or it may be taken from a vat or tank into which the milk may be poured from that container.

Another primary object of the invention is to insure that a true sample of the milk be taken, which sample will reflect the exact proportion of butterfat to milk as does the entire batch of milk from which the sample is taken. This is particularly important since butterfat tends to separate and rise to the top of the milk. Further objects and advantages of the invention will be found in the unique combination and association of the various elements as set out in the accompanying claims, including the extreme simplicity of operation; low cost of operation; low cost of initial production of the apparatus itself; and a high degree of "foolproof" operation even in the hands of inexperienced operators.

Reference is made to the accompanying drawings, in which,

Fig. 1 is a view in vertical elevation and section through an apparatus embodying the invention;

Fig. 2, a vertical section on an enlarged scale through the measuring valve on the line 2—2 in Fig. 1;

Fig. 3, an enlarged vertical sectional view of the measuring valve in the same plane as that shown in Fig. 1, but with the piston of the valve in an elevated position;

Fig. 4, a vertical section on an enlarged scale of an air flow fitting; and

Fig. 5, a schematic wiring diagram of an elementary control system.

A high vacuum producing unit 10 is mounted in any suitable position such as within a cabinet 11. This unit 10 is of a commercial form readily obtainable on the market, and consists of a unitary structure wherein there is a driving motor 12 operating a built-in pump 13 for creating vacuum, and also having a pressure discharge. A vacuum line 14 leads from the unit 10 to a control valve 15, a vertical cross-section of which is shown in Fig. 5.

The valve 15 is a solenoid and spring operated valve. When its solenoid winding 17 is not energized, a tubular, open lower-end piston 18 within the valve is urged to a relatively low position by the spring 19. In this position of the piston 18, a piston side orifice 20 registers with the valve body passageway 22 into which the pipe 14 connects; an upper orifice 21 registers with the valve body passageway 23 which opens to the atmosphere; and also the piston closes over a valve passageway 24 from which a pipe line 16 leads. Thus in the position of the piston 18, air may be pulled into the passageway 23, through the orifice 21, through the piston 18, out the orifice 20, the passageway 22, and into the pipe 14.

When the winding 17 is energized the piston 18 is lifted against the opposition of the spring 19 to an upper position, whereupon the orifices 20 and 21 are closed off and the underside of the piston 18 is sufficiently high to afford communication thereunder from the passageway 24 to the passageway 22, so that the line 16 may be subject to evacuation from the line 14.

The pipe 16 leads through the wall of the cabinet 11 to extend vertically upwardly to connect with a moisture separator 26. A pipe 27 leads from the moisture separator 26 to a T fitting 28. In the form herein shown, the pipe 27 connects with a horizontal opening 29 on one side of this fitting 28.

Through the top opening 36 of the fitting 28, there is fixed an electrode 37 in an air-tight manner, to have the electrode 37 extend down through the fitting 28 and into a surge chamber 38 demountably connecting to the lower vertical opening end 39 in the fitting 28. An electrical conductor 40 leads externally from the electrode 37 and back down to an electric control box 41 herein shown as in the cabinet 11.

The surge chamber 38 is essentially a tubular chamber, from the interior wall of which the electrode 37 is centrally and axially spaced. The lower end of the electrode 37 is spaced substantially midway between the top and bottom ends of the chamber 38.

At the lower end of the chamber 38 there is removably attached an elbow 42, and to this elbow 42 in turn is attached the measuring valve body 43 to connect to a horizontally disposed bore 44 therein.

On the opposite side of the valve body 43 there opens therefrom a horizontally disposed bore 45 at a slightly lower level than that of the bore 44 on the other side. Connecting with the valve body 43 to communicate with this bore 45 is an elbow 46, in turn connecting respectively with the pipe 47, elbow 48, pipe 49, elbow 50, and the intake tube or pipe 51.

The valve body 43 has a vertically disposed bore 52 therethrough, and this bore 52 is interconnected with the pipe 27 by means of the tube 53, the tube 53 leaving the pipe 27 through the T 54 and interconnecting the valve body 43 at the upper end of the bore 52 through the cap 55. The bore 52 of the body 43 is cylindrical, and extends axially of the body. Within this bore 52 there is placed with a sliding fit a cylindrical piston 56. A base 57 screw-threadedly engages with the body 43 and forms a lower stop against which the under side of the piston 56 may normally rest as indicated in Figs. 1 and 2. The base 57 has a downturned spout 58 extending therefrom from which fluids may be discharged from the body 43. As indicated primarily in Fig. 2, this spout 58 has a discharge end 59 extending in a plane extending diagonally upwardly from one side thereof so as to provide a lowermost lip 60 from which the fluid may drip in respect to the last few drops. In order to support the piston 56 above the opening 61 through the spout 58, there are provided a plurality of ears 62, herein shown as two in number to be in the path of the piston 56 so as to support it above the wall of the base 57.

The piston 56 is preferably made out of metal, in order to give it some appreciable weight so that it may drop quickly to its lowermost resting position on the ears 62. The piston 56 is provided with two transverse passageways 63 and 64, herein shown as being aligned on parallel axes, both axes being inclined upwardly from the bore 45 side toward the bore 44 side.

The passageway 63 is normally a return or drain passageway interconnecting the valve body passageways 44 and 45. The other passageway 64 in the piston 56 is the measuring passageway. Further relationship of these two passageways 63 and 64 in reference to the valve body passageways 44 and 45 will be explained in the following description of the operation of the apparatus.

While it is necessary to have an electric control means, and such control means may embody among other things an electronic amplification of current particularly in respect to a circuit to be closed by the electrode 37, the control system is described herein in a simple, elemental form as indicated in the diagram in Fig. 5, particularly in view of the fact that the exact electrical circuits do not form a part of the invention per se.

A second valve 33 is employed and, as distinguished from the valve 15 which controls evacuation of the line 16, this valve 33 controls application of differentials in pressure to that line 16. A pipe 34, connected to the pressure discharge of the pump 13, Fig. 5, also is connected with the passageway 35 of the valve 33, in turn opening into the side of and near the lower end of a vertical bore 85 of the valve 33. A tubular piston 30, closed at the top and open at the bottom, has a side orifice 31 normally registering with the passageway 35. A spring 32 within the upper end of the bore 85 compressibly bears between the upper end of the bore 85 and the top of the piston 30 to maintain that registry of the orifice 31 and passageway 35.

An orifice 25 registers in this same piston position with a passageway 125 in the valve 33, and to which passageway 125 the pipe line 16 is connected. A passageway 126, axially aligned with the passageway 35 is closed by reason of the piston wall extending thereover. When the solenoid winding 97 is energized, the piston 30 is lifted to have the piston close off the passageway 125, and provide communication from the passageway 35, across the bore 85, and with the passageway 126 which opens to the atmosphere.

When the switch 66 is closed to cause the pump 13 to operate, the line 16 is initially subjected to pressure.

The starting switch 66 is closed to interconnect a circuit between a power source and the motor 12 through the wires 67, 68, 69, the motor 12, the wire 70, the wire 71, and the wire 72 to the switch 66, the switch 66 herein being shown as of the double pole type. In this step of closing the switch 66, the motor 12 is set into operation, and the vacuum-pressure pump 13 accordingly starts operating.

The intake pipe 51 is therefore having air discharging from its free end by reason of the following flow. The air from the pump 13 flows through the valve 33 into the pipe 16, as described. From the pipe 16, Fig. 1, the air is pushed through the moisture trap 26, the pipe 27, T 28, surge chamber 38, elbow 42, passageway 44, bore 63, passageway 45, elbow 46, pipe 47, elbow 48, pipe 49, and the pipe 51. By reason of this flow, when the pipe 51 is inserted into the milk from which a sample is to be taken, the air pushes out milk otherwise tending to rise in the pipe 51. Were it not for this action, butterfat in the column of milk rising in the pipe 51 would tend to rise therein, and also, only concentration of butterfat at the surface of the milk into which the pipe 51 is inserted would tend to be carried therein, all of which would give an exaggerated butterfat content indication of the milk entering the pipe 51.

With the air blowing out from the pipe 51, the apparatus is then ready for operation to take the milk sample.

The closure of the switch 66 also causes energization of the primary winding 76 of the transformer 75 through the interconnecting wires 67, 77, and 72, 78, Fig. 5. A green pilot light 103 connected across the wires 67 and 72 indicates closure of the switch 66. A red lamp 110 is connected in parallel with the solenoid windings 17 and 97, to be illuminated when they are energized.

Air under pressure is then flowing out of the pipe 51 as above described, and the pipe 51 is inserted by its free end into the milk to be sampled.

The next step is to close a push button switch 92 whereby an electric circuit is closed from a ground 111, through the wire 112, the winding of a relay 79, the secondary winding 74 of the transformer 75, to the ground 113. This relay closes a circuit comprising the contact member 81, the wire 84, the wire 68, the wire 67, one side of the switch 66 to the power source, back through the other side of the switch 66, the wire 72, the wire 71, the wire 83, the wires 95 and 96, the valve solenoid windings 97 and 17, from those windings through the wires 98 and 99, the wire 82, and the relay finger 80; whereby the two windings 17 and 97 are energized to shift the respective valve pistons 18 and 30 to their upper positions and thereby shift from a pressurized to a vacuumized condition in the pipe line 16 and the connected elements to the pipe 51.

Simultaneously with that evacuation, the tube 53 is evacuated to in turn evacuate the upper portion of the internal bore 52 of the valve body 43 immediately above the piston 56, so that the piston 56 is promptly lifted to the top of the bore 52, Fig. 3. The upper end of the piston 56 is provided with the cushion washer 73 which will strike against the underside of the cap 55. As long as the tube 53 is evacuated, the piston 56 will remain in that uppermost position.

With the piston 56 in that uppermost position, the passageways 44 and 45 of the valve body 43 are then interconnected through the measuring passageway 64 through the piston 56, Fig. 3.

A column of milk will be immediately drawn up into the pipe 51 and through the interconnecting fittings and pipes to flow through the valve body 43, that is through the passageway 45, the piston measuring passageway 64, and the valve body passageway 44, and up through the elbow 42 into the surge chamber 38 until that column of milk comes into contact with the flow limit electrode 37. When that condition takes place, the milk forms a circuit-completing medium as between the electrode 37 and the metallic wall of the chamber 38.

The milk, thus interconnecting electrically the electrode 37 and the tube 38 which is grounded, as at 114, completes a circuit from the electrode 37, through the wire 100, a solenoid winding 101, the wire 102, the secondary winding 74, and the ground 113. By energizing the solenoid winding 101, the armature 104 tied to the walking beam 105 of the switch 92, is pulled to open that switch 92, to deenergize the relay 79 and thus permit the member 80 to drop away from the contact 81, and consequently deenergize the two valve solenoid windings 17 and 97 to allow the pistons 18 and 30 to return to their initial, normal positions, Fig. 5.

Air is then forced through the system from the valve 33 tending to force the measuring valve piston 56 back down to its lower position by pressure in the tube 53. A spring 87 is interposed between the cap 55 and the washer 73 to be secured in the present instance by its lower end being engaged by the screw 88 which retains the washer 73 on the piston 56. This spring 87, plus the weight of the piston 56, is normally sufficient to drop the piston 56.

When the piston 56 drops in the valve body 43, the passageway 64 is completely filled with the milk. The diameters of the passageways 63 and 64 and the spacing apart of the axes of those two passageways are so proportioned in relation to the diameters of the valve body passageways 44 and 45, that the passageway 64 has been sealed off from the two passageways 44 and 45 immediately upon the dropping of the piston 56 to the position indicated in Figs. 1 and 2. Then the volume of milk in the surge chamber 38 flows back downwardly through the elbow 42, the valve body passageway 44, the piston passageway 63, and the valve body passageway 45, back on down the members 46, 47, 48, 49, 50, and 51 to drop back into the container from which the milk has been initially withdrawn.

Thus it is to be seen that the milk in the passageway 64 at the time of dropping, is very definitely measured and cut off from the column of milk in that dropping action. When the piston 56 drops to bring the passageway 64 completely below the levels of the passageways 44 and 45, the lowermost portion of the passageway 64 opens into the member 57 to drain therein, and flow out through the spout 58, into any suitable receptacle which may be placed thereunder to receive that sample. This outward flow from the passageway 64 does not occur until the quantity of milk in that passageway 64 has been sealed off from the milk appearing in the passageways 44 and 45 of the valve body 43.

The proportioning of the openings through the piston 56 in relation to the construction of the valve body 43 is quite important in permitting the securing of an accurate sample of the milk. While these parts may be made in different proportionate sizes, depending upon the volume of the sample desired, for securing a ten cubic centimeter volume sample of the milk, one specific set of dimensions necessary for that sample is set out in regard to Fig. 3 primarily.

When the system is in the non-evacuated, or pressurized condition, the piston 56 will be resting by its underside on the ears 62 as indicated in Fig. 1. In this position, the upper transverse bore 63 through the piston 56 will then have its end openings in registry with the respective passageways 44 and 45 in the valve body 43. These two passageways 44 and 45 will each have the same diameter, namely substantially five-eighths of an inch. The axis of the passageway 44 is preferably positioned at an elevation approximately one-quarter of an inch above the axis of the passageway 45, both of these axes being parallel as above indicated and on horizontal lines.

With the piston 56 in its uppermost position, Fig. 3, the transverse passageway 63 through the piston 56 is closed off from the body passageways 44 and 45. However the point 89, the lowermost point of the sampling or measuring chamber 64 will then be at the point 90 of the passageway 45. Milk will then be flowing from the passageway 45 through this chamber or passageway 64 and upwardly through the passageway 44 on up toward the surge chamber 38. When the evacuating cycle is completed by the circuit completion between the milk, the electrode 37, and the chamber 38 as above described, the milk will start flowing backwardly and downwardly, under flow back pressure, and at the same time the piston 56 will be quickly dropping to its lowermost position again. As this piston 56 drops, milk will be flowing backwardly first in part through the passageway 64, keeping that passageway completely filled, and then when the passageway 63 comes down toward its registry with the passageways 44 and 45, the return milk flow will continue down through that passageway 63. As the piston 56 approaches the lowermost position, the land 86 between the passageways 63 and 64 upon passing by its under side below the passageways 44 and 45 seals off the sampling chamber 64 from interconnection between those passageways 44 and 45. The vertical thickness of this land 86 is made to be substantially five-sixteenths of an inch. The diameter of the chamber 64 is made to be substantially seven-eighths of an inch in diameter.

The vertical height of that part of the valve body 43 between the point 90 and the lowermost end of the body 43 indicated by the numeral 93, is made to exceed the diameter of the chamber 64, to be substantially one inch in length, or slightly thereabove, so that the end of the chamber 64 between the points 89 and 91 will be completely closed off with the points 89 and 91 of the chamber between the points 90 and 93 of the valve body. When these points are in that relation, the land 86 has closed off the chamber 64 from any further entrance of milk therein. Also this chamber 64 has been maintained completely filled with milk during that last interval of return flow of the milk before the piston 56 has dropped to have the land 86 close off further flow into that chamber 64.

Furthermore, the ears 62 are positioned at that elevation whereby the piston 56 in its downward travel will be stopped to hold the bore 63 into registry with the passageways 44 and 45. In this position, there will be an opening left at the lower end of the chamber 64 between the points 89 and 93 so that milk in that chamber will be permitted to flow out into the member 57 and finally out through the opening 59. This flow from that chamber 64 is further facilitated by reason of the fact that the point 94 at the upper, lower side end of the chamber 64 is then below the level of the underside 93 of the valve body 43. This permits air to enter to complete the entire drainage of the chamber 64.

In practice, the exact diameter of the chamber 64, its length, determined by the angle of its inclination and also the internal diameter of the valve body 43, that is of the bore 52 (one and one-quarter inches in the present showing), are determined exactly within precise limitations in order to have that chamber 64 measure out the exact volume of ten cubic centimeters of milk.

The piston 56 is held against rotation on its axis in the bore 52 by means of a vertically disposed key 109 held in the body 43 to extend in part, by a sliding fit into a vertically disposed slot 115 provided in the piston 56, Fig. 2.

It is to be emphasized that by reason of the pressure cycle following the vacuum cycle, the milk is washed in two directions through the measuring valve body 43 and its passageways as well as through the piston 56, followed by an air wash alone, so that practically no traces of milk remain in the bore 64, which would otherwise tend to form a sticky coating, or tend to prevent the extreme accuracy of volume of milk measured out as the sample.

While we have herein shown and described our invention in the one particular form in detail, it is obvious that structural variations may be embodied without departing from the spirit of the invention, and we therefore do not desire to be limited to that precise form beyond the limitations which may be imposed by the following claims.

We claim:

1. A milk sample taking apparatus comprising a conduit having a milk entrance end; a member intercepting the conduit, and shiftable between two positions responsive respectively to relatively high and low pressure conditions in said conduit, said member having a return flow passageway thereacross for conduit flow at said high pressure position and a measuring passageway thereacross for conduit flow at said low pressure position; a drain member into which said measuring passageway opens upon said high pressure condition; a vacuum producing means connected to said conduit in a zone on the side of said intercepting member removed from the milk entrance side; means for pressurizing said conduit to said high pressure condition; a pipe between said conduit zone and said intercepting member subjecting the member to said conduit high and low pressure conditions to supply motivating pressures respectively to effect shifting to said two positions; electrical means for actuating said pressurizing means; an electrode in said conduit between said intercepting means and said evacuating means; and an electric circuit including said electrode and said electrical means, closed upon milk flowing in said conduit to contact said electrode.

2. A milk sample taking apparatus comprising a conduit having a milk entrance end; a member intercepting the conduit, and shiftable between two positions responsive respectively to relatively high and low pressure conditions in said conduit, said member having a return flow passageway thereacross for conduit flow at said high pressure position and a measuring passageway thereacross for conduit flow at said low pressure position; a drain member into which said measuring passageway opens upon said high pressure condition; a vacuum producing means connected to said conduit in a zone on the side of said intercepting member removed from the milk entrance side; means for pressurizing said conduit to said high pressure condition; a pipe between said conduit zone and said intercepting member subjecting the member to said conduit high and low pressure conditions to supply motivating pressures respectively to effect shifting to said two positions; electrical means for actuating said pressurizing means; an electrode in said conduit between said intercepting means and said evacuating means; and an electric circuit including said electrode and said electrical means, closed upon milk flowing in said conduit to contact said electrode; a body having a vertical bore therein slidingly receiving said intercepting member; and a pipe interconnecting said bore with said conduit from a zone therein between said electrode and said evacuating means.

3. A milk sample taking apparatus comprising a conduit having a milk entrance end; a member intercepting the conduit, automatically shiftable between two positions responsive respectively to relatively high and low pressure conditions in said conduit, said member having a return flow passageway thereacross for conduit flow at said high pressure position and a measuring passageway thereacross for conduit flow at said low pressure position; a drain member into which said measuring passageway opens upon said high pressure condition; a vacuum producing means connected to said conduit in a zone on the side of said intercepting member removed from said milk entrance end; means for pressurizing said conduit to said high pressure condition tending to evacuate said conduit through said end; a pipe between said conduit zone and said intercepting member subjecting the member to said conduit high and low pressure conditions to supply motivating pressures respectively to effect shifting to said two positions; electrical means for actuating both of said means; and means for changing from a vacuum to a pressurized condition in said conduit following a predetermined flow of milk across said intercepting member.

4. A milk sample taking apparatus comprising a conduit having a milk entrance end; a member intercepting the conduit, and shiftable between two positions responsive respectively to relatively high and low pressure conditions in said conduit, said member having a return flow passageway thereacross for conduit flow at said high pressure position and a measuring passageway thereacross for conduit flow at said low pressure position; a drain member into which said measuring passageway opens upon said high pressure condition; a vacuum producing means connected to said conduit in a zone on the side of said intercepting member removed from the milk entrance side; means for pressurizing said conduit to said high pressure condition; a pipe between said conduit zone and said intercepting member subjecting the member to said conduit high and low pressure conditions to supply motivating pressures respectively to effect shifting to said two positions; electrical means for actuating said pressurizing means; an electrode in said conduit between said intercepting means and said evacuating means; and an electric circuit including said electrode and said electrical means, closed upon milk flowing in said conduit to contact said electrode; a body having a vertical bore therein slidingly receiving said intercepting member; and a pipe interconnecting said bore with said conduit from a zone therein between said electrode and said evacuating means; said intercepting member being a piston normally under urge to drop within said bore; stop means determining the lowermost position of said piston, said stop means being located to stop the piston at that position whereby there may be a conduit flow through said return flow passageway; said measuring passageway being located below said return flow passageway to leave a piston land therebetween to seal off said measuring passageway from said conduit flow in the lowermost piston position.

5. A milk sample taking apparatus comprising a conduit having a milk entrance end; a member intercepting the conduit, and shiftable between two positions responsive respectively to relatively high and low pressure conditions in said conduit, said member having a return flow passageway thereacross for conduit flow at said high pressure position and a measuring passageway thereacross for conduit flow at said low pressure position; a drain member into which said measuring passageway opens upon said high pressure condition; a vacuum producing means connected to said conduit in a zone on the side of said intercepting member removed from the milk entrance end; means for pressurizing said conduit to said high pressure condition tending to evacuate said conduit toward said end; a pipe between said conduit zone and said intercepting member subjecting the member to said conduit high and low pressure conditions respectively to supply motivating pressures respectively to effect shifting to said two positions; electrical means for actuating said pressurizing means; an electrode in said conduit between said intercepting means and said evacuating means; an electric circuit including said electrode and said electrical means, closed upon milk flowing in said conduit to contact said electrode; a body having a vertical bore therein slidingly receiving said intercepting member; and a pipe interconnecting said bore with said conduit from a zone therein between said electrode and said evacuating means; said intercepting member being a piston normally under urge to drop within said bore; stop means determining the lowermost position of said piston, said stop means being located to stop the piston at that position whereby there may be a conduit flow through said return passageway; said measuring passageway being located below said return flow passageway to leave a piston land therebetween; an upper stop limiting travel of said piston to an upper position whereby said measuring flow passageway provides conduit flow thereacross.

6. A milk sample taking apparatus comprising a conduit having a milk entrance end; a member intercepting the conduit, and shiftable between two positions responsive respectively to relatively high and low pressure conditions in said conduit, said member having a return flow passageway thereacross for conduit flow at said high pressure position and a measuring passageway thereacross for conduit flow at said low pressure position; a drain member into which said measuring passageway opens upon said high pressure condition; a vacuum producing means connected to said conduit in a zone on the side of said intercepting member removed from the milk entrance side; means for pressurizing said conduit to said high pressure condition; electrical means for actuating said pressurizing means; an electrode in said conduit between said intercepting means and said evacuating means; and an electric circuit including said electrode and said electrical means, closed upon milk flowing in said conduit to contact said electrode; a body having a vertical bore therein slidingly receiving said intercepting member; a pipe interconnecting said bore with said conduit from a zone therein between said electrode and said evacuating means; said intercepting member being a piston normally under urge to drop within said bore; stop means determining the lowermost position of said piston, said stop means being located to stop the piston at that position whereby there may be a conduit flow through said return passageway; said measuring passageway being located below said return flow passageway to leave a piston land therebetween; an upper stop limiting travel of said piston to an upper position whereby said measuring flow passageway provides for a continuous conduit flow; said body having a conduit opening orifice on opposite sides of said piston, said orifices being uncovered in either of said two piston positions for intercommunication; said lower, measuring passageway being made in volume to equal that volume of milk sample desired; said measuring passageway having a larger diameter than that of said orifices, and further being positioned in said piston to be closed off in said body from said conduit flow only after said return flow passageway has started to be registered with said orifices, said body being formed to provide an opening from said measuring passageway when the piston is in said lowermost position.

7. Apparatus for obtaining a precisely measured volume of a liquid which comprises a pipe having one end to be submerged in the liquid; means selectively producing a high degree of vacuum in the pipe as a means of pulling the liquid into the pipe; valve means interposed in said pipe; a piston in said valve means arranged to be shifted across a liquid flow in the pipe between said end and said vacuum means; said piston having a passageway thereacross for said flow, and having a volume equal to that of the desired fluid sample; and a body in said valve means within which said piston is shiftable; said body having a discharge opening with which said piston passageway may communicate upon shifting the piston to carry its said passageway out of said flow; whereby said passageway is initially filled by said liquid flow in the conduit in one position, and the piston may be shifted to cut off that passageway-filled liquid from said flow and deliver it to said body opening communication in a second position; a liquid surge chamber as a part of said conduit located between said body and said evacuating means; an electrode in said surge chamber; a flow line connection from said pipe tween said surge chamber and said vacuum means to said body; electrically actuated means for restoring the conduit to substantially atmospheric pressure following a period of evacuation; and an electric circuit including said electrode and said actuated means closed by contact of said liquid with said electrode; whereby said liquid may reverse its direction of flow in said conduit and through said measuring passageway; said body being at a higher elevation than that of said one end, and said surge chamber being at a higher elevation than that of said body.

8. Apparatus for obtaining a precisely measured volume of a liquid which comprises a pipe having one end to be submerged in the liquid; means selectively producing a high degree of vacuum in the pipe as a means of pulling the liquid into the pipe; valve means interposed in said pipe; a piston in said valve means arranged to be shifted across a liquid flow in the pipe between said end and said vacuum means; said piston having a passageway thereacross for said flow, and having a volume equal to that of the desired fluid sample; and a body in said valve means within which said piston is shiftable; said body having a discharge opening with which said piston passageway may communicate upon shifting the piston to carry its said passageway out of said flow; whereby said passageway is initially filled by said liquid flow in the conduit in one position, and the piston may be shifted to cut off that passageway-filled liquid from said flow and deliver it to said body opening communication in a second position; a liquid surge chamber as a part of said conduit located between said body and said evacuating means; an electrode in said surge chamber; electrically actuated means for restoring the conduit to substantially atmospheric pressure following a period of evacuation; and an electric circuit including said electrode and said actuated means closed by contact of said liquid with said electrode; whereby said liquid may reverse its direction of flow in said conduit and through said measuring passageway; said body being at a higher elevation than that of said one end, and said surge chamber being at a higher elevation than that of said body; a pipe interconnecting between an end portion of said body and said conduit between said surge chamber and said evacuating means to make the pressure in said body responsive to the pressure in said conduit, to have said piston held in said first position for liquid flow through its measuring passageway when said conduit is at a pressure below atmospheric, and means yieldingly shifting the piston to said second position upon increase in the conduit pressure.

9. Apparatus for obtaining a precisely measured volume of a liquid which comprises a pipe having one end to be submerged in the liquid; means selectively producing a high degree of vacuum in the pipe as a means of pulling the liquid into the pipe; valve means interposed in said pipe; a piston in said valve means arranged to be shifted across a liquid flow in the pipe between said end and said vacuum means; said piston having a passageway thereacross for said flow, and having a volume equal to that of the desired fluid sample; and a body in said valve means within which said piston is shiftable; said body having a discharge opening with which said piston passageway may communicate upon shifting the piston to carry its said passageway out of said flow; whereby said passageway is initially filled by said liquid flow in the conduit in one position, and the piston may be shifted to cut off that passageway-filled liquid from said flow and deliver it to said body opening communication in a second position; means for normally yieldingly maintaining said piston in its second position; and means responsive to reduction in conduit pressure for shifting the piston to have its measuring passageway receive said conduit flow therethrough.

10. Apparatus for obtaining a precisely measured volume of liquid from a batch thereof, comprising a liquid pipe line having one end available for submerging in the batch, said line being extended from said end to an upper portion at a higher elevation; a valve body in said line having opposing side connections with said line into a vertically disposed bore; said body being intermediate said end and said line portion; a piston freely slidable between lower and upper limits in the body bore; said piston having a passageway extending transversely across the piston with opposite end openings placed to interconnect said line through said body connections when the piston is at its upper travel limit; said piston having a second passageway extending transversely across the piston above the first passageway with end openings to provide an inter-flow between said valve body connections when the piston is in its lower limit position; means for evacuating said line to induce a liquid flow from said end through said valve body connections toward said pipe upper portion; said valve body having a drain into which said piston first passageway discharges when the piston is in said lower position; means for restoring said line to a higher pressure condition following operation of said evacuating means, to cause a return flow of said fluid in said line toward said pipe end; and means responsive to high and low pressure conditions in said line for shifting said piston between its said limits of travel.

11. Apparatus for obtaining a precisely measured volume of liquid from a batch thereof, comprising a liquid pipe line having one end available for submerging in the batch, said line being extended from said end to an upper portion at a higher elevation; a valve body in said line having opposing side connections with said line into a vertically disposed bore; said body being intermediate said end and said line portion; a piston freely slidable between lower and upper limits in the body bore; said piston having a passageway extending transversely across the piston with opposite end openings placed to interconnect said line through said body connections when the piston is at its upper travel limit; said piston having a second passageway extending transversely across the piston above the first passageway with end openings to provide an inter-flow between said valve body connections when the piston is in its lower limit position; means for evacuating said line to induce a liquid flow from said end through said valve body connections toward said pipe upper portion; said valve body having a drain into which said piston first passageway discharges when the piston is in said lower position; means for restoring said line to a higher pressure condition following operation of said evacuating means, to cause a return flow of said fluid in said line toward said pipe end; and means responsive to pressure conditions in said line for shifting said piston between its said limits of travel; said responsive means comprising a pipe interconnecting the upper end of said bore with said pipe line between said upper portion and said evacuating means; and means normally retaining the piston in its lower limit position.

12. A device for obtaining a precisely measured sample of milk from a supply thereof, comprising a pipe for communication by an intake end with said supply; means selectively producing vacuum and pressure in said pipe for drawing milk into and pushing it out of said pipe through said end; a sample receiving member interposed in said pipe between said end and said means, said member having a measuring chamber therein through which said milk flows when being drawn into said pipe; pressure control means actuated upon a predetermined milk flow past said chamber to change the pipe from a vacuumized to a pressurized condition to reverse the milk flow in the pipe; a cylinder carrying said member; means automatically causing shifting of said member in said cylinder in relation to said pipe to close off said chamber from communication with the pipe upon initiation of said pressurized condition whereby said chamber having been filled with milk in the vacuumized condition carries that milk as a sample away from the milk flow in said pipe; and a pressure line interconnecting said cylinder and said milk pipe between an intake flow limit zone and said vacuum-pressure producing means whereby said member in the cylinder is subject to the pressures in said line to constitute said member automatic shifting means.

NORMAN C. KOTTKAMP.
PAUL J. BAILEY.
JOSEPH M. TRIMBLE.
ROBERT M. LANGSENKAMP.

REFERENCES CITED

The following references are of record in the file of this patent:

UNITED STATES PATENTS

| Number | Name | Date |
| --- | --- | --- |
| 2,217,855 | Bassler | Oct. 15, 1940 |
| 2,426,369 | Paulsen | Aug. 26, 1947 |
| 2,434,723 | Shook | Jan. 20, 1948 |
| 2,450,715 | Campbell | Oct. 5, 1948 |
| 2,463,481 | Ferraez, Jr. | Mar. 1, 1949 |